Figure 6:
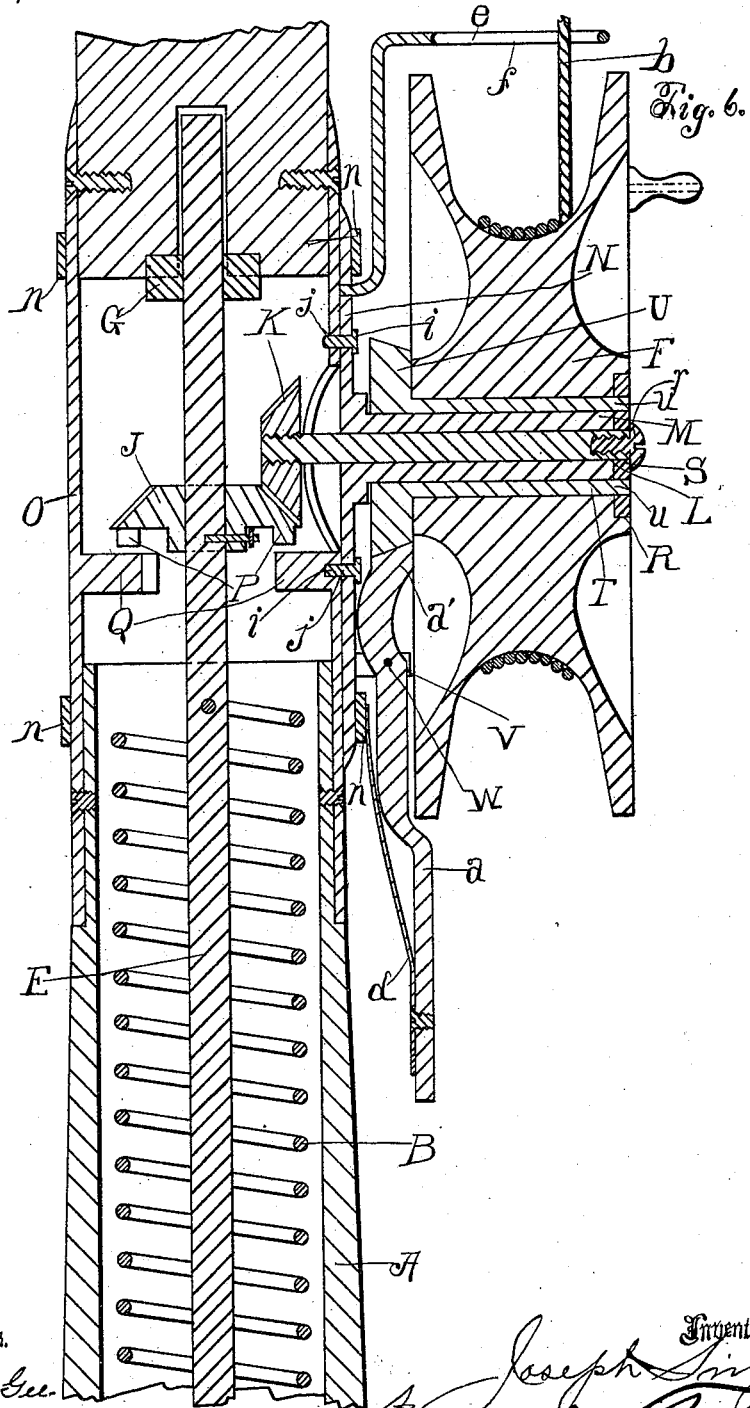

(No Model.) 2 Sheets—Sheet 1.
J. SINGER.
FISHING REEL.
No. 491,955. Patented Feb. 14, 1893.
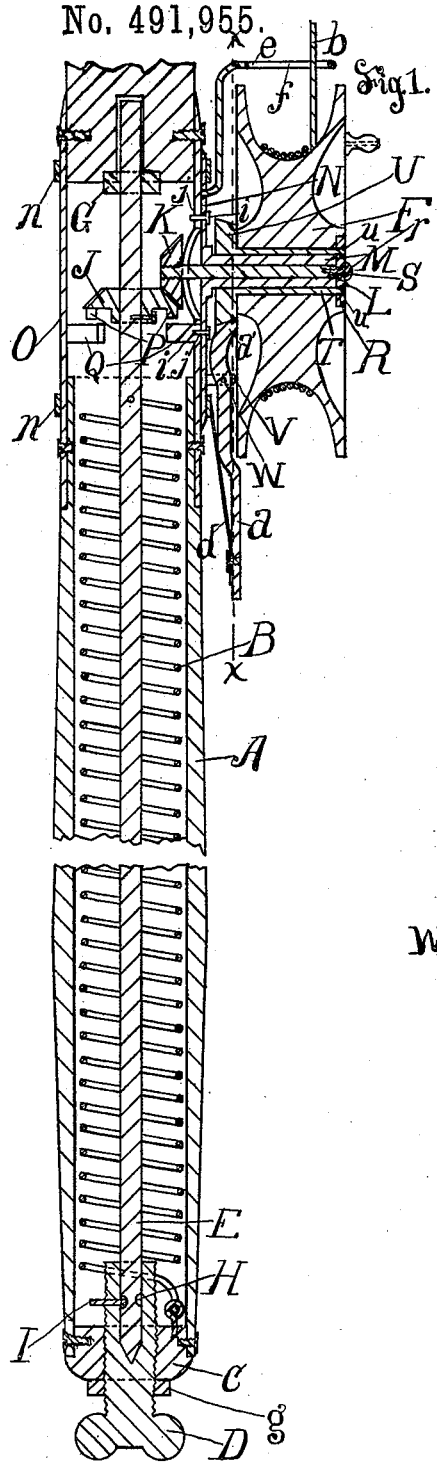
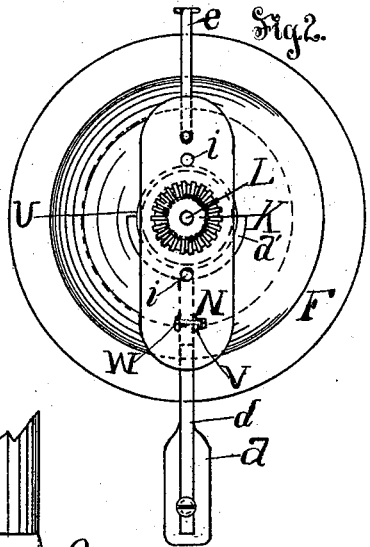
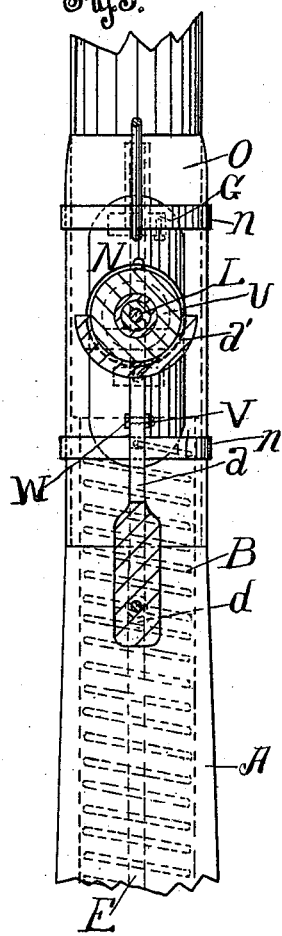
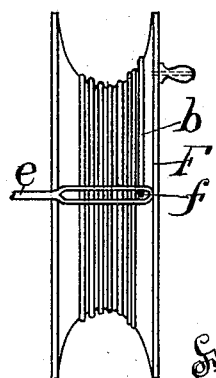
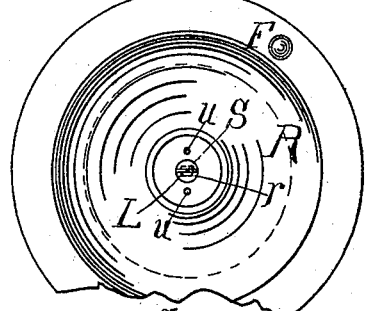
Witnesses.
Inventor.
Joseph Singer
by Hazard Townsend
his atty.

(No Model.) 2 Sheets—Sheet 2.

J. SINGER.
FISHING REEL.

No. 491,955. Patented Feb. 14, 1893.

Witnesses.
M. M. Gee.
Alfred D. Townsend.

Inventor.
Joseph Singer
Hazard & Townsend.
his attys.

UNITED STATES PATENT OFFICE.

JOSEPH SINGER, OF LOS ANGELES, CALIFORNIA.

FISHING-REEL.

SPECIFICATION forming part of Letters Patent No. 491,955, dated February 14, 1893.

Application filed July 1, 1892. Serial No. 398,152. (No model.)

*To all whom it may concern:*

Be it known that I, JOSEPH SINGER, a citizen of the United States, residing at Los Angeles, in the county of Los Angeles and State of California, have invented a new and useful Improvement in Spring-Actuated Reels for Fishing-Rods, of which the following is a specification.

My invention relates more particularly to that class of reels which are designed to be revolved by a spring situated in the hollow handle of the rod to which the reel is attached.

The object of my invention is to produce a reel and operative mechanism for actuating the same, whereby at the will of the operator the reel may be connected with the spring actuated mechanism, or may be disconnected therefrom and used as an ordinary hand operated reel, without allowing the spring to unwind and lose its tension when the reel is disconnected from the spring actuated mechanism.

A further object of my invention is to provide means whereby the reel may be removed from the rod without leaving any projecting shaft upon the rod to interfere with the convenient casing and transportation of the rod.

A further object is to produce a more convenient and powerful brake than heretofore known for controlling the revolution of the reel.

My invention comprises the combination with a fishing rod having a hollow handle and spring actuated reel driving mechanism situated in such handle, of a reel attaching plate arranged for attachment to the rod and provided with an outwardly projecting hollow journal sleeve; a reel journaled upon such journal sleeve; a reel actuating spindle journaled in the hollow journal sleeve and attached at its outer end to the reel and provided upon its inner end with a driven wheel arranged to engage the spring actuated driving wheel within the rod when the reel is attached to the rod, and a suitable stop arranged to engage the spring actuated mechanism within the rod when the reel is disengaged therefrom.

My invention also comprises various features and combinations hereinafter more fully set forth and claimed.

The accompanying drawings illustrate my invention.

Figure 1 is a longitudinal mid-section of the butt of a rod with a reel attached illustrating my invention. Fig. 2 is a rear elevation of the reel removed from the rod. Fig. 3 is a front elevation of a fragment of the rod the reel being removed and parts shown in section; line *x—x* Fig. 1 indicates the line of section. Fig. 4 is a plan view of the reel and the line guide. Fig. 5 is a fragmental front elevation of the reel. Fig. 6 is an enlarged view of the upper portion of Fig. 1 showing the reel and a fragment of the rod in longitudinal mid-section.

The handle A of the rod is hollow and in the chamber is placed the spring B which serves as the motive power to actuate the reel F.

In the drawings I have shown a coiled spring arranged around an axially movable driving shaft E, having one end attached to such shaft, the other end being attached to the handle of the rod. The lower end of the hollow handle is closed by suitable means such as a cap plug C, and through the closed end is passed the axially movable shaft journal post D in the inner end of which is journaled the lower end of the shaft E; suitable means are arranged to prevent the shaft from withdrawing from its seat in the journal post. In the drawings such means comprise a catch formed by the annular groove H provided in the shaft E, and the pin I passed through the wall of the journal post D and arranged to project into the groove in the shaft. The upper end of the shaft E is journaled through a suitable journal box G secured to the lower end of the body of the rod and projects through such journal a sufficient distance to allow the shaft E to move a considerable distance axially without withdrawing the shaft from the journal box G.

*g* is a jam nut arranged upon the journal post D.

A suitable distance below the top of the shaft E is rigidly fixed a driving cog wheel J which is arranged to actuate the reel F, through suitable intermediate means such as the cog K and spindle L.

In order to arrange the reel so that when the reel is removed from the rod there will be no projecting shaft to interfere with the packing and handling of the rod, I provide an attaching plate N, which is of the ordinary shape and is secured to the rod by the usual bands n n, and has rigidly fixed thereto a hollow journal sleeve M which forms the support upon which the reel F revolves.

To furnish convenient means for connecting the reel with the spring motive power in the butt of the rod I provide the driven spindle L which is provided upon one end with the beveled driven cog wheel K and passes through the hollow journal sleeve M in which it freely revolves, and is secured at its other end to the reel F by suitable means.

As shown, the means for securing the driven spindle to the reel consists of the washer R which is provided with an angular hole S arranged to receive the angular end of the spindle L and secured to the reel by the journal skein T which extends through the reel and is arranged to journal the sleeve M, and is provided upon its inner end with a bevel edge friction brake wheel U and upon its outer end with the lugs u u which pass through suitable perforations in the washer or cap plate R, and are secured by riveting them therein. This binds the reel F, washer R and friction wheel U firmly together, and the angular end of the spindle L is secured in the washer by means of the screw r screwed into the end of the spindle L and arranged to project beyond the circumference of the spindle to bear upon the washer as illustrated in Figs. 1 and 6. The reel F, spindle L, washer R, skein T and friction wheel U are thus adapted to revolve together and the hollow journal sleeve M forms the journal which supports the various parts. When the plate N is removed from the rod, the reel shaft is also removed and there is no projection left on the rod.

The cog wheels J and K are beveled and are arranged to normally mesh with each other when the reel is in place upon the rod.

To enable the operator to disengage the reel from the spring actuated mechanism when desired, and to prevent the spring from unwinding and losing its tension when thus disengaged, the wheel J is provided with two downwardly projecting lugs P, and upon the handle of the rod are fixed two outwardly projecting lugs Q arranged a little below the plane of the circle described by the lower end of the lugs P when the wheel J is revolved in its normal position. These lugs, however, are arranged so close to such plane, that when the shaft E is moved axially downward by actuating the journal post D, the lugs P will engage the lugs Q before the cogs of the wheel J are withdrawn from the cogs of the wheel K, thus preventing rotation of the wheel J and shaft E and consequent unwinding of the spring B when the wheels are disengaged.

To provide convenient and powerful means for controlling the revolution of the reel F I provide a friction brake a the shoe a' of which is beveled to fit upon the beveled friction wheel U; and to give greater bearing upon the wheel the shoe is preferably extended to encircle about one-half the circumference of the wheel. The brake is pivoted to the plate N by means of a post V and pivot W and is normally held in contact with the friction wheel by means of a spring d. The beveled brake wheel enables the brake to be so constructed that the brake can be released by moving the brake shoe in the direction of or along the axis of the reel, thus allowing the brake lever to be pivoted to the plate N and to release the brake by moving the lever toward the rod instead of sidewise as would be required if the brake shoe and brake were arranged in the ordinary manner.

l is a line guide provided with a line slot f and arranged to guide the line b upon the reel.

To prevent the plate N from shifting so as to disengage the reel from the operating mechanism, I provide the pins i which are secured to such plate and are arranged to enter holes j j provided in the hollow ferrule O which is arranged between the butt of the rod and the hollow handle. The reel is placed upon the rod and secured by the rings n n; the shaft E is drawn downward by unscrewing the journal post D to disengage the wheel J from the wheel K; the line is then wound upon the reel, and the post D is actuated to place the wheels J and K again in connection, and the line is then drawn off to revolve the reel and give the tension to the spring B. When the spring has been wound enough to produce the desired tension the post D is retracted to disconnect the wheels J and K, and the line is again wound upon the reel and the wheels are then again thrown into engagement.

In practice the operator unreels sufficient line and makes a cast; the brake a prevents the reel from being revolved by the spring. When a fish is hooked, the sportsman loosens the brake and the spring B acting upon the reel allows the line to unreel and when the fish turns, the slack is instantly taken up, thus automatically playing the fish without any effort on the part of the sportsman. The revolution of the reel can be controlled perfectly and naturally by the brake, the handle of which is within convenient grasp of the operator. If the operator prefers to revolve the reel by hand, he can quickly withdraw the wheel J from its engagement with the wheel K, and thus in an instant change the reel from a spring actuated reel into an ordinary hand operated reel.

It is obvious that other means of engaging the spring actuated driving mechanism to prevent the rotation thereof when disengaged from the reel, may be employed without departing from the spirit of my invention. It is also plain that other means of moving the driving shaft to remove the driving mechanism from its operative engagement with the reel may be employed without departing from my invention, and I do not limit my claims to the particular construction shown.

Now having described my invention, what I claim as new, and desire to secure by Letters Patent, is—

1. The combination set forth of a fishing rod having a hollow handle; a spring actuated driving wheel situated in such handle; a reel attaching plate arranged for attachment to the rod and provided with an outwardly projecting hollow journal sleeve; a reel journaled upon such journal sleeve; a reel actuating spindle journaled in such hollow journal sleeve and attached at its outer end to the reel and provided upon its inner end with a driven wheel arranged to engage the spring actuated driving wheel within the rod when the reel is attached to the rod, and a suitable stop arranged to engage the spring actuated driving wheel within the rod when the reel is disengaged therefrom.

2. In a fishing reel, the combination of the attaching plate arranged for attachment to a fishing rod; a suitably journaled reel attached to such plate and provided with the circular beveled edge friction wheel; a friction brake pivoted to the plate and provided with a beveled edge brake shoe arranged to engage such friction wheel, and a suitable handle for operating such brake.

3. In a fishing rod and reel the combination of a rod provided with a hollow handle; an axially movable spring actuated driving shaft journaled to revolve in such handle; a driving wheel fixed to such shaft and provided with a projecting lug; means for moving the driving shaft axially to disengage the driving wheel from the driven wheel; a suitable lug fixed to the handle and arranged to engage the lug upon the driving wheel when the shaft is moved axially to disengage the driving wheel from the driven wheel; such driven wheel; a reel, and suitable intermediate means connecting the driven wheel and the reel.

4. In a fishing rod of the class described the combination of the axially movable spring actuated driving shaft provided with the driving wheel; the reel; the driven wheel connected with the reel and arranged to engage the driving wheel to actuate the reel; suitable means for moving the driving shaft axially to disengage the driving wheel from the driven wheel, and a suitable stop fixed to the rod and arranged to engage the driving wheel to prevent its rotation when the shaft is moved axially to disengage such wheel from the driven wheel.

5. In a fishing rod having a spring actuated driving wheel situated within the handle, the combination of a driven wheel mounted upon a spindle; a reel attached to such spindle and provided with a friction wheel; a brake arranged to engage such friction wheel and provided with a suitable handle, and suitable means for attaching the reel to the rod to place the driving and driven wheel in operative engagement with each other.

6. In a fishing rod the combination of a hollow handle; having a closed lower end; a movable journal post passed through its lower closed end and arranged for axial movement; an axially movable spring actuated driving shaft having one end journaled in such journal post and its other end journaled through a suitable journal box fixed to the rod and arranged to allow axial movement of the shaft; suitable means arranged to prevent the shaft from withdrawing from its seat in the journal post; a driving wheel fixed to the driving shaft and arranged to normally engage a driven wheel to actuate a reel and provided with a lug arranged to engage a stop fixed to the handle of the rod when the shaft is moved axially to disengage the driving wheel from the driven wheel, and means for moving the journal post axially.

JOSEPH SINGER.

Witnesses:
 JAMES R. TOWNSEND,
 ALFRED I. TOWNSEND.